United States Patent [19]

Westhoff

[11] 4,036,411
[45] July 19, 1977

[54] LOW PROFILE AUGER AND HOPPER ASSEMBLY

[75] Inventor: Loren N. Westhoff, Salem, S. Dak.

[73] Assignee: SOS Consolidated, Inc., Birmingham, Mich.

[21] Appl. No.: 617,110

[22] Filed: Sept. 26, 1975

[51] Int. Cl.² .......................................... B65G 33/14
[52] U.S. Cl. .................................. 222/413; 198/616; 198/661
[58] Field of Search ................ 198/64, 213, 214, 540, 198/616, 661; 214/17 D; 222/413, 178

[56] References Cited

U.S. PATENT DOCUMENTS

| 2,792,098 | 5/1957 | Teske | 198/214 X |
| 3,017,008 | 1/1962 | Olson | 198/213 X |
| 3,035,682 | 5/1962 | Ferch | 198/64 |
| 3,080,960 | 3/1963 | Rensch | 198/64 |
| 3,251,467 | 5/1966 | Bakke | 198/213 X |
| 3,675,367 | 7/1972 | Amburn | 198/213 X |
| 3,729,087 | 4/1973 | Brans | 198/64 X |

FOREIGN PATENT DOCUMENTS 828,564   12/1969   Canada ................ 198/64

Primary Examiner—Robert B. Reeves
Assistant Examiner—David A. Scherbel
Attorney, Agent, or Firm—Williamson, Bains & Moore

[57] ABSTRACT

A low profile auger and hopper assembly for use in conveying and distributing a granular product such as animal feeds or the like is disclosed herein. The apparatus preferably comprises a hopper for receiving the product such as feed or the like and an associated auger assembly for distributing the hopper contents. The hopper preferably comprises a rigid, planar surface which is oriented substantially parallel with the ground or other surface for supporting the apparatus and a plurality of sidewalls which extend integrally upwardly from the planar surface and are rigid therewith. The auger assembly includes a tubular housing member having a rotatable auger disposed therewithin, and it is received by the hopper and oriented substantially obliquely with respect to the planar hopper surface. The lower end of the auger includes a tapered flighting portion positioned substantially adjacent to the planar surface of the hopper so that mechanical contact between the planar surface and the auger is obviated. The combination of a lower, tapered auger flighting portion and the rigid hopper planar surface enables the apparatus to be operably positioned closer to the ground (or other supporting surface) than prior art devices.

1 Claim, 5 Drawing Figures

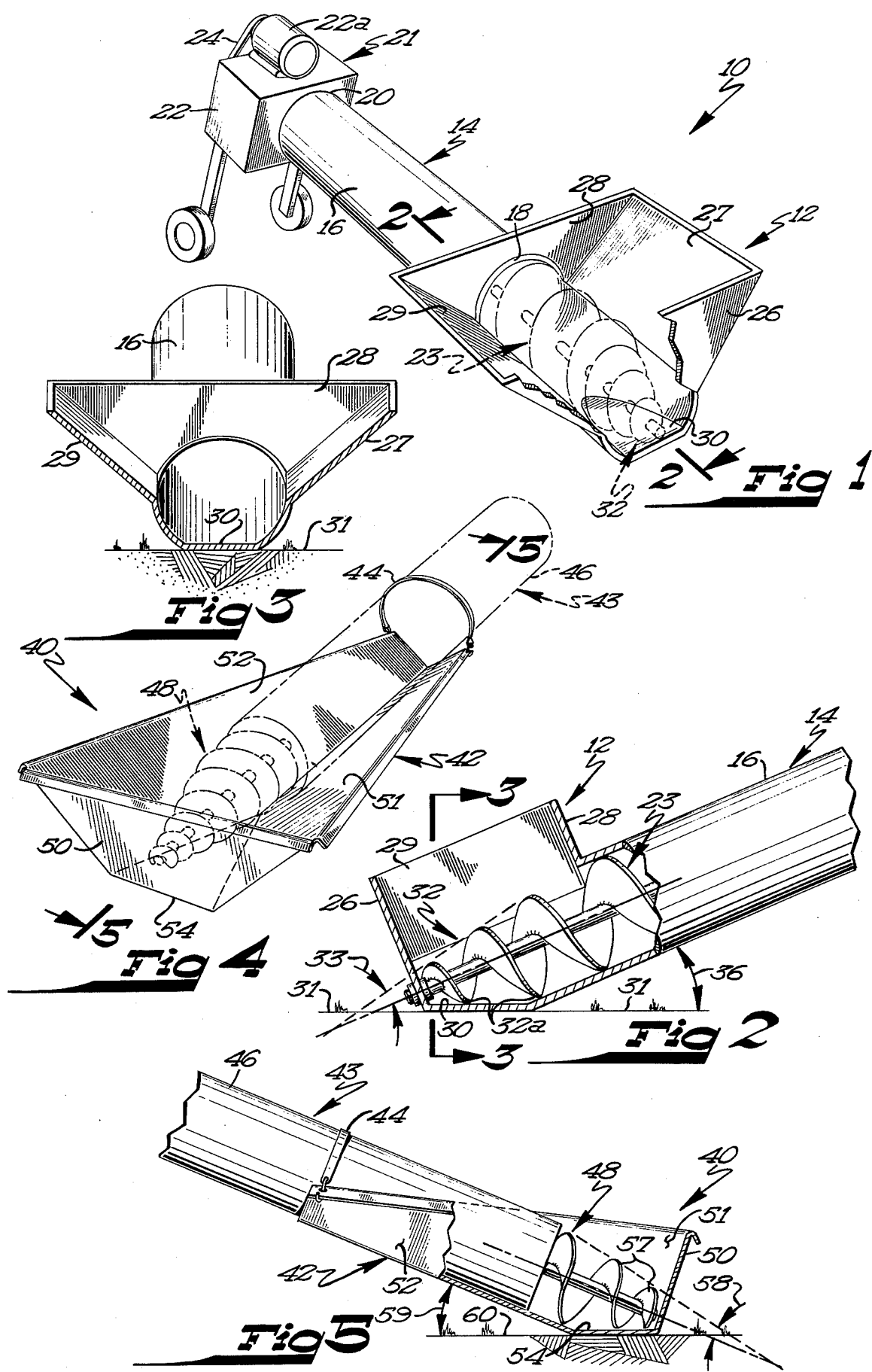

LOW PROFILE AUGER AND HOPPER ASSEMBLY

BACKGROUND OF THE INVENTION

This invention relates broadly to agricultural implements such as hoppers and the like. More particularly, the present invention comprises a low profile auger and hopper assembly for use in receiving and distributing agricultural products such as feeds, roughage, grains or the like.

Hoppers are generally used to receive rough particulate material which is to be distributed through augers or other conveying machinery to a predetermined location. Most hoppers are comprised of a plurality of sidewalls and a lower, rigid oblique internal surface which cooperate to provide a feed or product receptive enclosure. An auger or other conventional conveying apparatus may be associated with the hopper to convey the contents thereof to a desired position. For example, augers may be conventionally used to convey grain or corn to an upper storage bin. Alternatively, such conveying apparatus can be utilized to load a hopper during the discharge operation.

The hopper essentially comprises a box which will be filled by machinery such as a dump truck. Because of the construction of prior art hoppers, it is difficult for a dump truck, for example, to back up to a conventional hopper and raise its bed to discharge its load into the hopper without interference with the hopper. Difficulties arise because prior art hoppers are vertically offset from the ground somewhat severely. Usually the vertical dimension of the conventional hopper is necessary to accommodate the auger associated therewith because the flighting portion of the auger might otherwise contact the rigid surfaces associated with the hopper resulting in mechanical damages and difficulty. To prevent contact with the auger flighting, and to prevent formation of a "void" spot from which product will not be conveyed, the lower surface of conventional hoppers is oriented substantially parallel to the axis of the auger, obliquely with respect to the ground (or other supporting surface). As a result, conventional auger/hopper assemblies concentrate their weight at a single point or area, and structural damage to the hopper may consequently occur.

SUMMARY OF THE INVENTION

The present invention comprises a product conveying and distribution apparatus characterized by a low vertical profile.

The apparatus preferably comprises a hopper for receiving granular product which is to be distributed and an associated obliquely inclined auger assembly. The hopper preferably comprises a rigid planar surface which will be substantially parallel to the ground or other supporting surface, and a plurality of sidewalls which extend integrally upwardly from the planar surface to form a product receptive enclosure. The tubular auger assembly will be receivably associated with the hopper for distributing the contents thereof. The auger assembly comprises an auger housing which is received by the hpper obliquely with respect to the planar hopper surface, and an internal tapered flighting portion. The tapered flighting prevents mechanical contact between the flat planar hopper surface and the auger, because the flighting taper angle is substantially equal to the angle between the auger assembly and the planar hopper surface. Thus, the tapered auger flighting will enable the auger to thoroughly unload the hopper, while at the same time enabling the vertical dimensions of the hopper to be minimized. The resultant low profile of the apparatus enables a conventional dump truck, for example, to back up next to the hopper and discharge its load by raising its bed without contacting the upper part of the hopper.

In an alternative embodiment of this invention the rigid planar surface is an integral part of the auger housing. The hopper is constructed from a plurality of vertically upwardly extending sidewalls which are rigid with the auger housing, and, as before, a tapered flighting auger is utilized to facilitate efficient unloading of the apparatus. The angle of the tapered auger flighting is substantially equal to the angle between the oblique auger housing and the ground (or other supporting surface).

Thus, it is an object of this invention to provide a product conveying and distribution apparatus characterized by an extremely low vertical profile.

Another object of this invention is to provide apparatus of the character described which is capable of distributing and handling a large volume of feed or the like. It is an important feature of this invention that with the construction disclosed the capacity of the apparatus is not substantially decreased while the vertical dimensions thereof are minimized.

A further object of this invention is to prevent dead spots within a hopper having a flat lower planar surface.

Still another object of this invention is to provide feed handling apparatus of the character described which will function adequately and efficiently with a wide variety of agricultural implements.

A still further object of this invention is to povide apparatus of the character described which will function with a minimum of maintenance and repairs.

These and other objects of this invention along with features of novelty appurtenant thereto, will appear or become apparent in the course of the following description.

BRIEF DESCRIPTION OF THE DRAWINGS

In the following drawings, which form a part of the specification and are to be construed in conjunction therewith, and in which like reference numerals have been employed to indicate like parts in the various views;

FIG. 1 is a perspective view of a LOW PROFILE AUGER AND HOPPER ASSEMBLY construed in accordance with the teachings of this invention, and with parts thereof broken away or shown in section for clarity;

FIG. 2 is a side sectional view of the apparatus taken along line 2—2 of FIG. 1;

FIG. 3 is a sectional end view of the apparatus taken along line 3—3 of FIG. 2 with parts thereof broken away or shown in section for clarity;

FIG. 4 is a perspective view of an alternative embodiment of the invention in which the lower planar surface comprises an integral part of the hopper; and FIG. 5 is a section side view of the apparatus taken along line 5—5 of FIG. 4.

DETAILED DESCRIPTION OF THE DRAWINGS

With initial reference to FIGS. 1 and 2, a preferred form of a low profile auger and hopper assembly 10 is there shown. The unitary apparatus 10 includes a hopper 12 and a tubular auger assembly 14 which is received by the hopper. Auger assembly 14 comprises an elongated, tubular auger housing 16 which has a lower end 18 received internally of hopper 12 and an upper end 20 which is received within a conventional, movable drive mechanism 21. Mechanism 21 comprises an enclosure 22 and an auger drive motor 22a. Alternatively, it is contemplated that auger assembly end 20 may be received within other product receptive enclosures such as corn cribs, silos and the like. The auger assembly also comprises a conventional auger 23 which is rotatably enclosed interiorly of housing 16, and which is driven by motor 22a through a conventional belt 24.

Hopper 12 preferably comprises a plurality of vertically upwardly diverging sidewalls 26 through 29. A lower planar surface 30, at the bottom of hopper 12, forms a feed receptive enclosure with walls 26 – 29. As best seen in FIG. 2, planar surface 30 is substantially parallel to the ground 31 (or other supporting surface) on which hopper 12 will normally rest. In the embodiment shown in FIGS. 1 – 3 surface 30 comprises a flattened, bottom portion of auger housing 16.

The lower end of auger 23, which is received within the hopper 12, comprises a tapered flighting portion 32. The flighting is tapered so that the auger will not mechanically contact the interior confines of the hopper 12. As will be noted in FIG. 2, the angle 33 at which the auger is tapered is substantially equal to the angle 36 between the auger housing and the planar surface 30 (or ground). In other words, the angle 36 between ground 31 and the auger assembly 16 is preferably substantially equal to the angle of taper 33 in the lower auger flighting portion. By the construction disclosed planar surface 30 may be oriented substantially flat with respect to the ground 31, and at the same time a dead or void area within the hopper will be prevented, because the lower tapered flighting augerportion 32a will be substantially parallel to planar surface 30. Such a dead area can occur in prior art hopper and auger assemblies, for example, when a space is inadvertently created between the flighting portion of the auger and the internal surfaces of the hopper. When such dead areas occur the product which fills them remains in the apparatus and must be moved by inconvenient manual unloading operations.

Referring now to FIG. 4, an alternative embodiment 40 of the low profile auger and hopper assembly is depicted. The apparatus 40 similarly includes a hopper 42 for receiving product to be conveyed and an associated auger assembly 43, which is removably rigidly attached to hopper 42 by a strap 44. Auger assembly 43 preferably comprises an elongated, tubular auger housing 46 and an internally disposed, conventional rotatable auger 48. The hopper 42 xomprises a plurality of vertically upwardly diverging sidewalls 50 through 52, and a lower planar surface 54, which as in the previously described embodiment, will be substantially parallel to the ground or supporting surface. Walls 50 through 52 are integral with the edges of planar surface 54. While surface 54 is substantially triangular, it is of course contemplated that the planar surface may take on a variety of configurations or shapes. Note, for example, the generally parabolic shape of surface 30 in FIG. 1. Hopper walls 51 and 52 are rearwardly inclined and provide support for auger assembly 43.

Auger 48 includes a tapered flighting portion 57 which is received internally of hopper 42 substantially adjacent to planar surface 54. Again, the angle of taper 58 of the flighting portion 57 is substantially equal to the angle 59 betwen the groung 60 (or other supporting surface) and auger housing 46. In this manner dead or void spots within hopper 42 are prevented. At the same time, since planar surface 54 substantially abuts the ground 60 (or other supporting surface) a low profile characteristic is achieved.

Thus with the construction previously disclosed, dead spots are obviated and the internal capacity of the apparatus is enhanced. Because of the low vertical profile characteristics of the apparatus, it may be used with a wide variety of loading and unloading apparatus. Since the vertical dimensions of the apparatus are minimized, due in part to the tapered flighting and the lower planar surface employed in each of the embodiments, the apparatus is more maneuverable than prior art devices and occupies less space. Importantly, since in each case a lower planar surface contacts the ground or other supporting surface on which the apparatus rests, stress forces are uniformly distributed and structural damage to the apparatus is less likely to occur.

From the foregoing, it will be seen that this invention is one well adapted to obtain all the ends and objects herein set forth, together with oterh adbantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention I claim:

1. Product conveying and distribution apparatus adapted to be disposed upon a supporting surface, said apparatus comprising:
    a hopper for receiving said product, said hopper comprising:
    2 a rigid, planar base surface of substantially triangular shape substantially parallel to said supporting surface, and adapted to contact same;
        a plurality of sidewalls extending integrally upwardly from said planar surface and rigid therewith defining an upwardly opening product receptive enclosure; and
        a rear wall projecting upwardly from a bottom edge of said hopper which intersects and coincides with the base line of said substantially triangular shaped base surface; and
    an auger assembly comrising:
        an elongated, tubular auger housing of substantially uniform diameter throughout the greater portion of its length having a rotatable auger supported and disposed therewithin, said auger assembly being received within said hopper obliquely with respect to said planar hopper surface, at a first predetermined angle with respect to said supporting surface; and said auger comprising a tapered flighting portion disposed adjacent said planar hopper surface, said tapered flighting portion of said auger tapered t a second predetermined angle, said first and second predetermined angles being substantially equal, whereby dead spots withibn said hopper are substantially avoided and mechanical contact between said planar surface and said auger tapered portion is obviated.

* * * * *